(12) United States Patent
Pendse

(10) Patent No.: US 6,298,056 B1
(45) Date of Patent: Oct. 2, 2001

(54) CREDIT BASED TELEPHONY SERVICE FACILITATION

(75) Inventor: Ajit B. Pendse, Portland, OR (US)

(73) Assignee: ITXC, Inc., Beaverton, OR (US)

( * ) Notice: Subject to any disclaimer, the term of this patent is extended or adjusted under 35 U.S.C. 154(b) by 0 days.

(21) Appl. No.: 09/574,961

(22) Filed: May 19, 2000

(51) Int. Cl.⁷ .................................................. H04L 12/64
(52) U.S. Cl. .................................... 370/352; 370/252
(58) Field of Search ............................. 370/252, 352, 370/353, 356; 705/14, 40; 379/67.1, 91.01, 93.01, 111, 112, 113, 114, 133, 140

(56) References Cited

U.S. PATENT DOCUMENTS 5,740,231 * 4/1998 Cohn et al. ...................... 379/93.01
5,870,030 * 2/1999 DeLuca et al. ................... 340/25.44
6,035,281 * 3/2000 Crosskey et al. ...................... 701/14

* cited by examiner

Primary Examiner—Huy Vu
(74) Attorney, Agent, or Firm—Columbia IP Law Group, PC

(57) ABSTRACT

Advertisement consumption activities of a user are monitored. The user is credited with telephony service credits in accordance with observed advertisement consumption activities. In turn, telephony service for the user is facilitated. The facilitation is based at least in part on the amount of telephony service credits credited to the user.

12 Claims, 9 Drawing Sheets

600

| Subscriber ID 602 | Subscriber Information 604 | Credit 606 | |
|---|---|---|---|
| | | | |
| | | | |
| | | | |
| | | | |
| | | | |

CREDIT BASED TELEPHONY SERVICE FACILITATION

BACKGROUND OF THE INVENTION

1. Field of the Invention

The present invention relates to the fields of telecommunication, networking, and on-line information delivery. More specifically, the present invention relates to an enhanced approach for facilitating telephony services for a user.

2. Background Information

Advances in microprocessor, networking, and telecommunication technologies have led to the development of large scale public networks, such as the Internet. In turn, it has led to the development of packet based telephony (also known as voice over IP, or VOIP, where IP stands for the Internet Protocol, referring to a "variant" of the Transmission Control Protocol (TCP)). Emergence of packet based telephony has led to the provision of "free" long distance calls, although call quality, and therefore user experience, remains a challenge, as packet delivery over public networks, such as the Internet, is on a "best effort" basis. As a result, delays and packet lost occur frequently. To improve call quality and user experience, various technologies have emerged to "fuse" packet based telephony with the traditional switch based telephone network, Public Switching Telephone Network or PSTN. For example, U.S. Pat. No. 5,889,774, assigned to the assignee of the present invention, disclosed an approach for a collection of packet based telephony bridge servers to select among themselves, the "best" bridge server to transition a packet based phone call back onto the traditional PSTN. As a further example, U.S. patent application Ser. No. 08/818,321, also assigned to the assignee of the present invention, disclosed an approach to completely transition a packet based phone call back to a traditional PSTN analog call.

The challenge to improve user experience of packet based telephony service continues and never end. Thus, additional innovations to further enhance user experience are always desired.

SUMMARY OF THE INVENTION

Advertisement consumption activities of a user are monitored. The user is credited with telephony service credits in accordance with observed advertisement consumption activities. In turn, telephony service for the user is facilitated. The facilitation is based at least in part on the amount of telephony service credits credited to the user.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by digital systems, using terms such as packets, transmit, receive, and the like, consistent with the manner commonly employed by those skilled in the art to convey the substance of their work to others skilled in the art. As well understood by those skilled in the art, these quantities and operations take the form of electrical, magnetic, or optical signals capable of being stored, transferred, combined, and otherwise manipulated through mechanical and electrical components of the digital systems. The term digital systems includes general purpose as well as special purpose data/signal processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
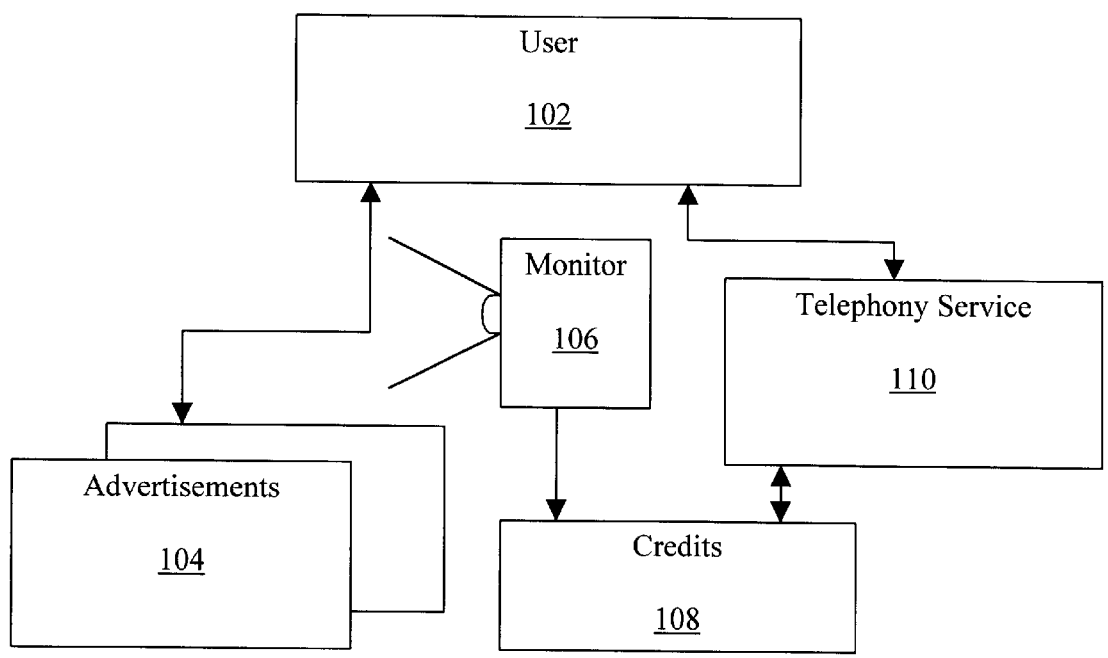
FIG. 1 illustrates an overview of the present invention.

Referring now FIG. 1, wherein a block diagram illustrating an overview of the present invention is shown. As illustrated, advertisements 104 are delivered to user 102 for "consumption". In one embodiment, advertisements 104 are on-line advertisements, such as banner advertisements, and "consumption" for the purpose of this application (including the claims) means passive and/or active interactions with the advertisements. These "interactions" include, but are not limited to, allowing the advertisements to be displayed, and responding to the displayed advertisements, such as "clicking" on the displayed advertisement to acquire additional information about the product/service being advertised.

Advertisement consumption activities of user 102 are monitored, e.g. using monitor 106. User 102 is credited with telephony service credits 108 in accordance with observed advertisement consumption activities. In due course, telephony service 110 is facilitated for user 102. In accordance with the present invention, the facilitation is based at least in part on the amount of telephony service credits 108 credited to user 102.

Figure 2:
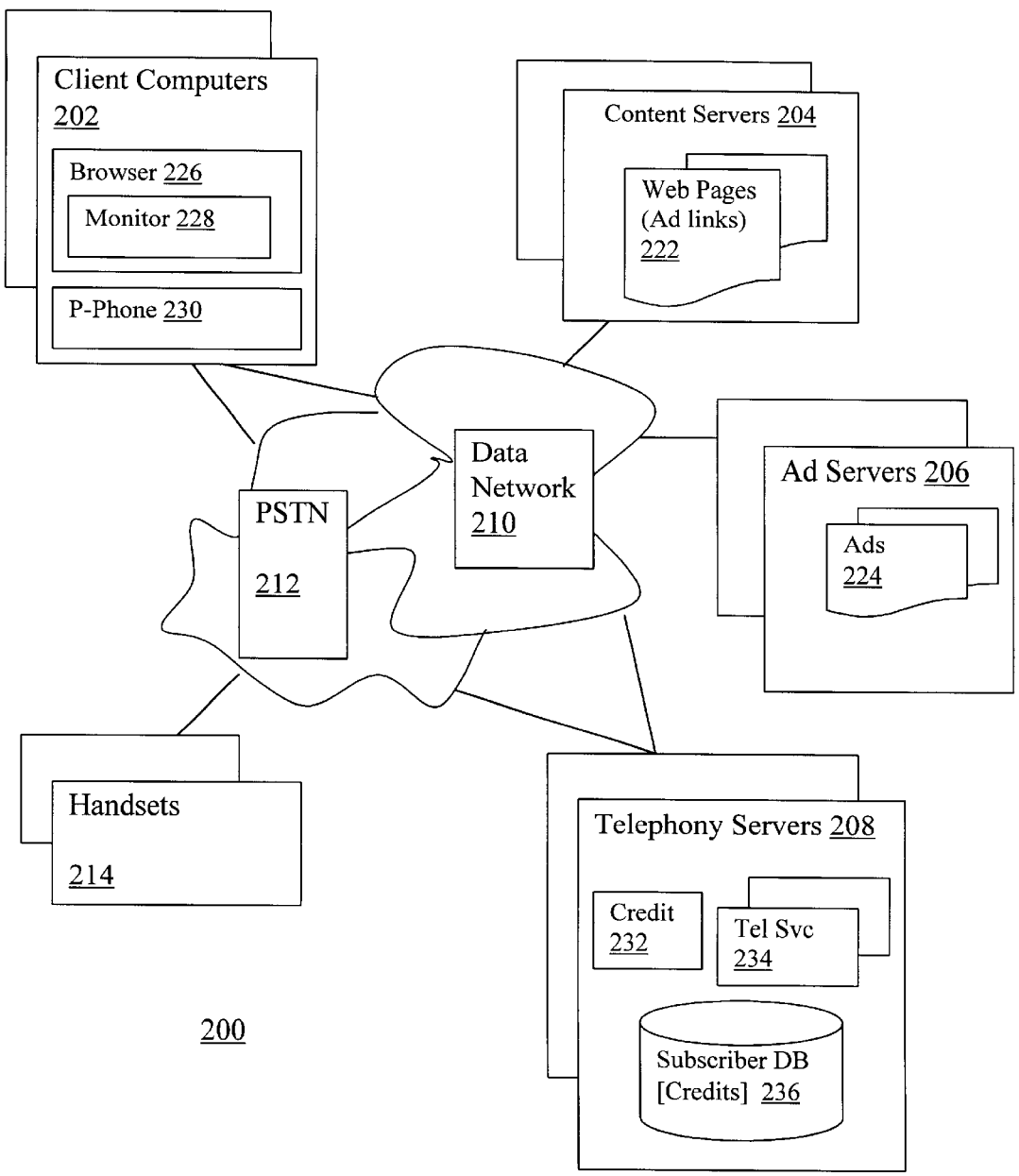
FIG. 2 illustrates a networking environment suitable for practicing the present invention, in accordance with one embodiment.

FIG. 2 illustrates a network environment suitable for practicing the present invention, in accordance with one embodiment. As illustrated, network environment 200 includes client computers 202 and telephony servers 208, incorporated with the teachings of the present invention. Additionally, network environment 200 also includes content servers 204, advertisement servers 206 and handsets 214. The various elements are communicatively coupled to each other through data network 210 and PSTN 212. More specifically, some client computers 202 are coupled to the other elements directly through data network 210 (those having direct networking access, such as Integrated Data Service Network (ISDN), Digital Subscriber Line (DSL) or cable modem services), and so forth, while others are coupled to the other elements indirectly through PSTN 212 (those with e.g. dial-up modems). Handsets 214 are coupled to PSTN 212, while content servers 204 and advertisement servers 206 are coupled to data network 210. Telephony servers 208, instead, are coupled to both, i.e. data network 210 as well as PSTN 212.

Each client computer 202 includes browser 226 enhanced with a monitoring function or module (monitor 228) of the present invention. Further, each client computer 202 is equipped with a packet based telephone 230. Each content server 204 includes information pages or web pages 222 having embedded links to various advertisements, and each advertisement servers 206 includes the linked advertisements 224. Telephony servers 208 collectively include credit module 232, telephony service modules 234 and subscriber databases 236.

Client computers 202 are intended to represent a broad range of computers, network appliances and the like, known in the art. Examples of these "devices" include, but are not limited to, desktop computers such as Dimension Computer available from Dell Computer of Austin, Tex., and iMac available from Apple Computers of Cupertino, Calif., and hand held computing devices like Palm Pilots available from 3COM of San Jose, Calif. Except for monitor 228, which will be described in more detail below, browser 226 is also intended to represent a broad range of browsers known in the art, including but not limited to Netscape Navigator and Internet Explorer. Likewise, packet based telephone 230 is also intended to represent a broad range of such telephony applications known in the art. [Some or all of these product names are trademarks of the respective manufacturers.]

Content servers 204, web pages 222, advertisement server 206, and advertisements 224 are all intended to represent a broad range of these elements known in the art. Examples of content servers 204 include, but are not limited to, MSNBC.com, Yahoo.com, and so forth, and web pages 222 include, but are not limited to, web pages found on these sites. Likewise, examples of advertisement servers 206 include, but are not limited to, servers of Double Click, Flycast Network, and so forth, and advertisements 224 include, but are not limited to, advertisements found on these sites.

Data network 210 is intended to represent a wide range of interconnected private and public networks, each constituted with networking equipment such as gateways, switches, routers and the like, such as the Internet. PSTN 212 is intended to represent the traditional public switch based telephone network, including the local or central offices, service transfer points (STP), service control points (SCP), and the intelligent network (IN) inter-coupling these elements. Handsets 214 are intended to represent a broad range of conventional wall mount, table top, or cordless telephone handsets.

Telephony Servers 208, except for credit module 232 and enhancements made to telephony service modules 234 and subscriber database 236, which will be described in more detail below, are intended to represent the bridge servers that "fuse" over data network packet based telephony with conventional PSTN based telephony, such as those disclosed in the aforementioned U.S. Pat. No. 5,889,774, and U.S. patent application Ser. No. 08/818,321.

Figure 3A:
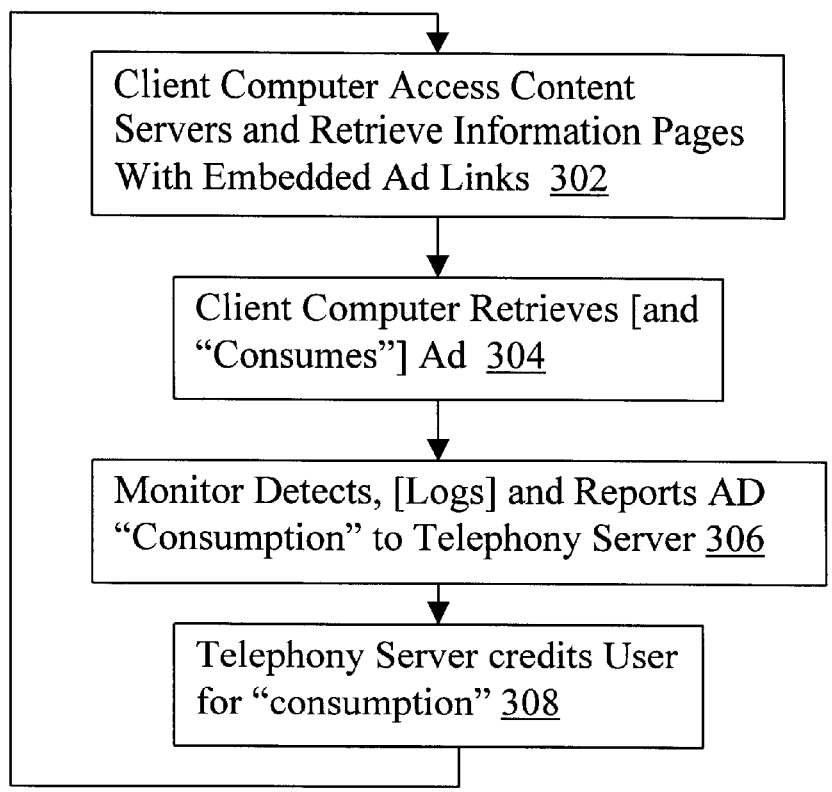
FIGS. 3a–3b illustrate two methods of operation of the present invention, in accordance with one embodiment each.
Figure 3B:
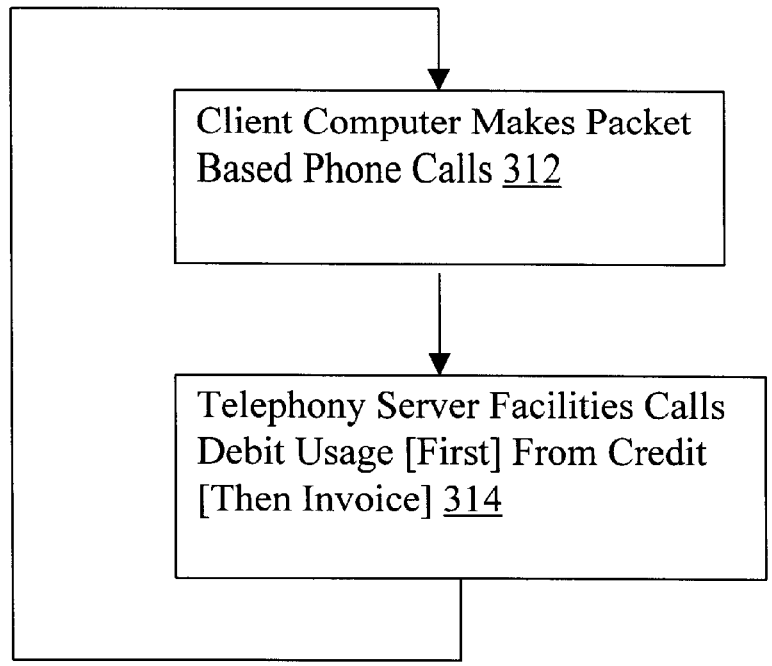

FIGS. 3a–3b illustrate the method of the present invention, in the context of the network embodiment of FIG. 2. As illustrated in FIG. 3a, at 302, client computer 202, using browser 226, accesses content server 204 to retrieve information or web pages 222 (having embedded advertisement links), block 302. Upon receipt of the information/web pages, client computer 202, using browser 226, further accesses advertisement servers 206 to retrieve the linked advertisements 224, block 304. Client computer 202 "consumes" the advertisements by permitting their display, and optionally, responding to the displayed advertisements by e.g. "clicking" on selected ones of displayed advertisements to retrieve further information. While client computer 202 retrieves these web pages and advertisements, and optionally interacts with the advertisements, incorporated monitor 228 monitors the advertisement consumption activities, and reports the observed advertisement consumption activities to telephony servers 208, block 306. Upon receipt of the reporting, telephony servers 208, via credit module 232, credits the user for the "consumption", block 308.

In one embodiment, monitor 228 includes with its monitoring, identity information of the advertisers, and includes the advertiser identity information with its reporting. In one embodiment, monitor 228 makes the reporting in real time, i.e. contemporaneous with the observation. In another embodiment, monitor 228 logs the observations and makes its reporting periodically. In one embodiment, the periodic reporting is made at the initiation of client computer 202, and in another embodiment, the periodic reporting is made in response to the polling of telephony servers 208. In one embodiment, credit module 232 credits the user (also referred to as subscriber of telephony server's service) with credits in proportion to the amount of observed advertisement consumption activities being related to advertisements of certain sponsors. Sponsors are those companies, institutions, organizations, or even individuals, who underwrite the cost of the telephony services that are going to be provided by telephony servers 208 based on the credits given. In one embodiment, the credits given also vary depending on the nature of the consumption, e.g. displaying of an advertisement of a sponsor gets x amount of credits, whereas "clicking" on an advertisement of a sponsor gets y amount of credits, and so forth. The exact amount of credits given for each type of activities is application dependent, and may vary from embodiment to embodiment.

In due course, as illustrated in FIG. 3b, client computer 206, using packet based phone 230, makes or receives phone calls, block 312. These phone calls may be with another client computer 202 having like kind of equipment or with conventional handsets 214. These phone calls are serviced or bridged by servers 208. See the aforementioned U.S. Pat. No. 5,889,774 and U.S. patent application Ser. No. 08/818, 321 for further descriptions. Except, in accordance with the present invention, to be described in more detail below, telephony servers 208 facilitate the phone calls based at least in part on the amount of telephony service credits the user has been credited. In one embodiment, the phone calls are facilitated strictly based on the amount of credits available. That is, upon exhaustion of the credits given, no services will be provided. This approach is particularly suitable for servicing trial or guest "subscribers". In another embodiment, the phone calls are facilitated first based on the amount of credits available, and upon exhaustion of the credits given, the user is invoiced for the additional services provided. This approach is particularly suitable for servicing regular subscribers.

Before describing monitor 228, credit module 232, relevant enhancements to telephony service modules 234 and subscriber database 236 in further details, it should be noted that while the present invention is being described with content servers 204 and advertisement servers 206 cooperatively provisioning the advertisements, and telephony servers 208 giving and tracking the credits, as well as facilitating the telephony service, the present invention may be practiced in alternate embodiments with some or all of these roles re-distributed and/or combined. For examples, advertisements may be provisioned by the content servers directly, that is in some cases, content servers 204 and advertisement servers 206 are combined, or giving and tracking of credits may be performed by advertisement servers 206 instead. Thus, those skilled in the art, will appreciate that various modifications and alterations may be made to practice the present invention, without departing from the spirit and scope of the claims.

Figure 4:
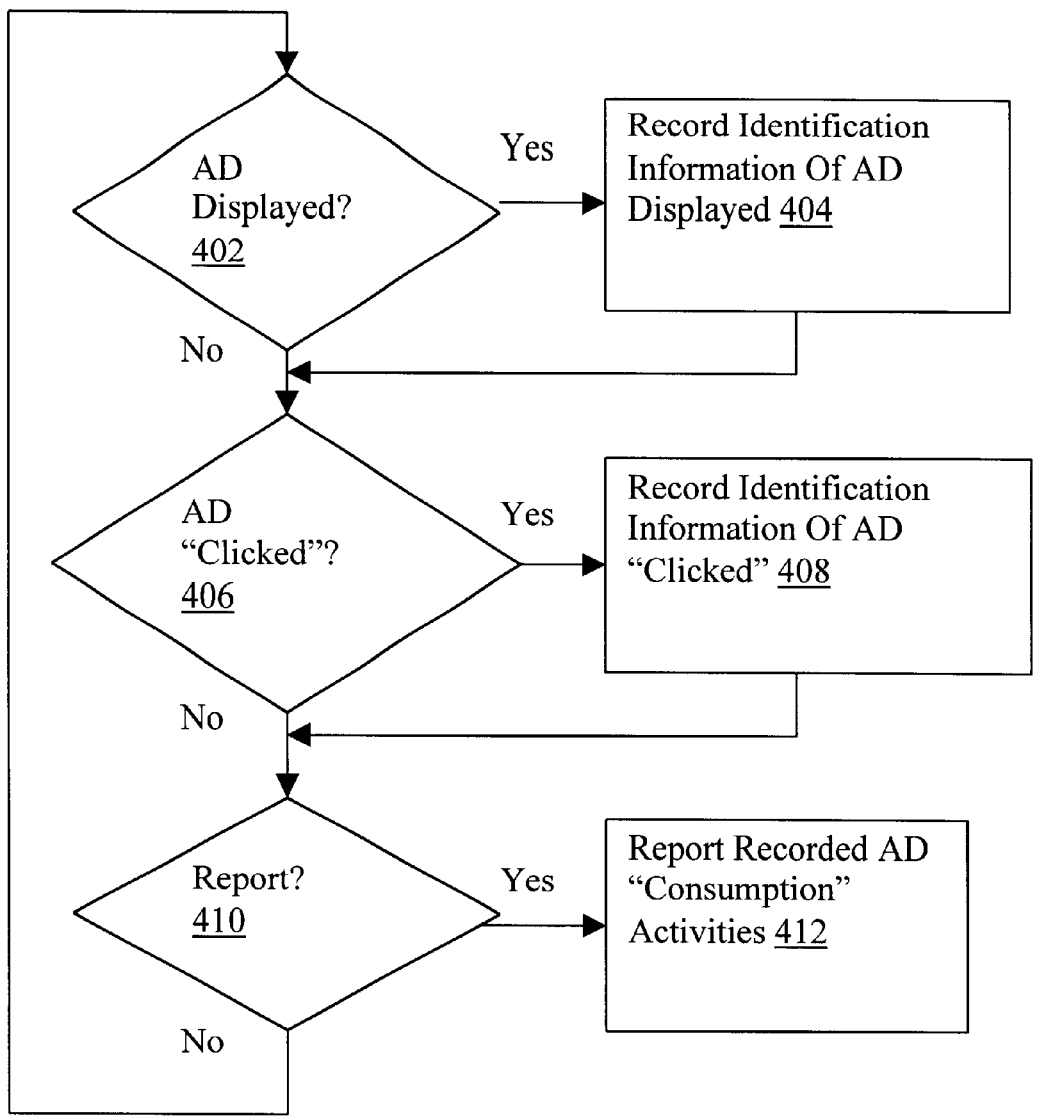
FIG. 4 illustrates an operation flow of the monitor of FIG. 2, in accordance with one embodiment.

Turning now to FIG. 4, wherein a block diagram illustrating the flow of the operation of monitor 228, as it relates to the present invention, in accordance with one embodiment, is shown. As illustrated, at 402, monitor 228 checks to determine if an advertisement is being displayed. Such checking may be accomplished e.g. by "watching" the messages returned to browser 226 from the communication services of client computer 202, using any one of a number of techniques known in the art. If an advertisement is displayed, monitor 228, at 404, records identification and other descriptive information describing the advertisement displayed, e.g. time and date of the display, the source of the advertisement etc. The amount of information to be recorded is application dependent, and may vary from embodiment to embodiment.

If an advertisement is not being displayed, monitor 228, at 406, determines if the user just "clicked" on a displayed advertisement. Similarly, such determination may be accomplished e.g. by "watching" the event notifications sent to browser 226 from the cursor control device drivers of client computer 202, using any one of a number of techniques known in the art. If an advertisement was "clicked", monitor 228, at 408, records identification and other descriptive information describing the advertisement "clicked", as in the earlier display situation. Again, the amount of information to be recorded is application dependent, and may also vary from embodiment to embodiment.

If an advertisement was not "clicked", monitor 228, at 410, determines if it is time to report the recorded advertisement consumption activities. As described earlier, the reporting may be initiated by monitor 228 or made in response to a poll by telephony servers 208. Periodic initiations may be accomplished e.g. by using "timers" or other known techniques, and "polling" may be accomplished e.g. using any one of a number of messaging techniques known in the art. If it is time for reporting, monitor 228, at 412, reports the recorded/observed advertisement consumption activities to telephony servers 412 as earlier described.

The process then continues back at 402, as long as browser 226 is executing.

Figure 5:
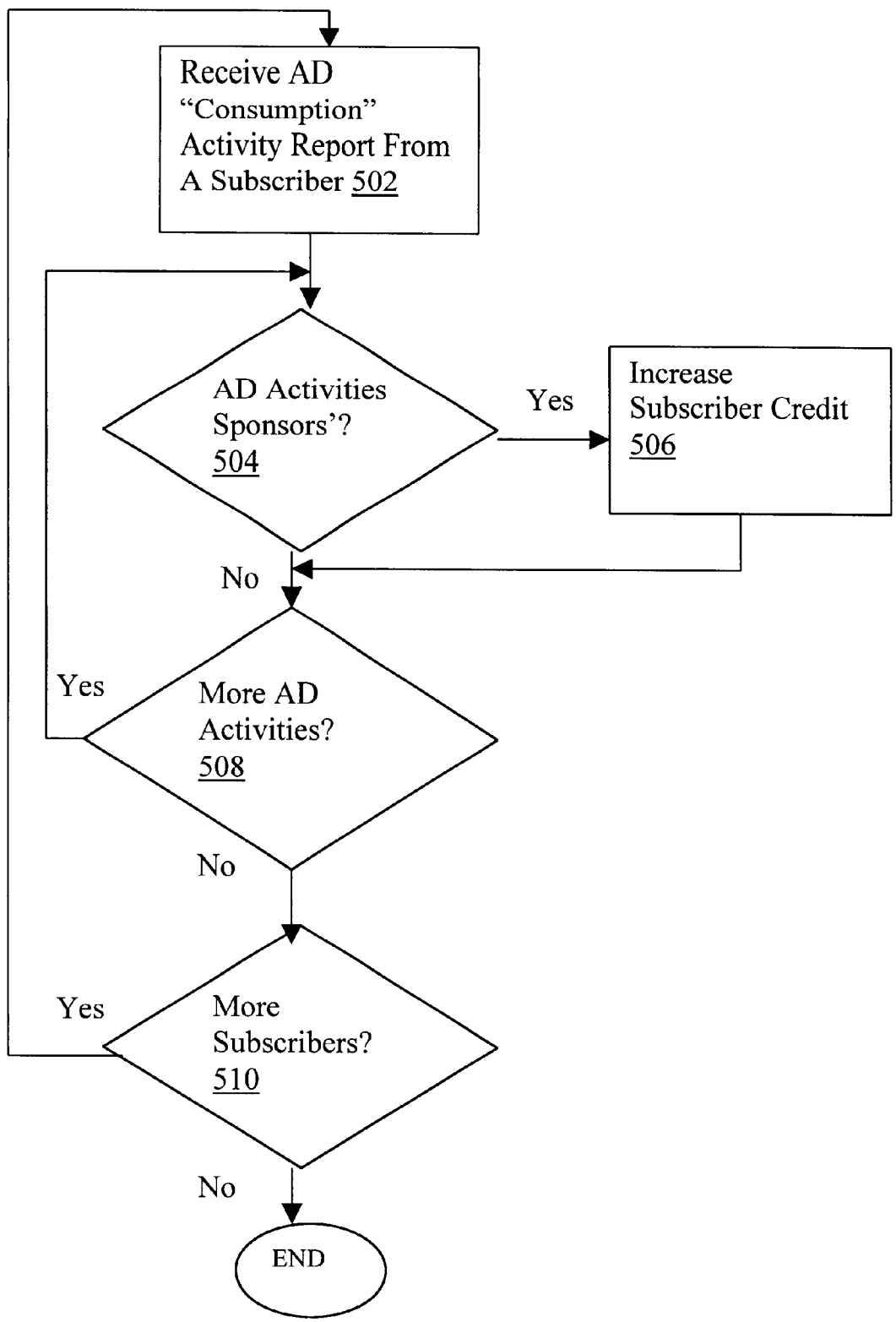
FIG. 5 illustrates an operation flow of the credit module of FIG. 2, in accordance with one embodiment.

Referring now to FIG. 5, wherein a block diagram illustrating the flow of the operation of credit module 232, as it relates to the present invention, in accordance with one embodiment, is shown. As illustrated, at 502, credit module 232 receives advertisement consumption activities reporting for a subscriber. At 504, credit module 232 examines a reported activity to determine if the subscriber should be credited [in one embodiment, i.e. whether the reported activity is related to an advertisement of a sponsor]. If the user is to be given credit, at 506, credit module 232 credits the subscriber accordingly. As alluded to earlier, the amount of credit given is dependent on the nature of the reported activity, and the precise amount for each type of activities is application dependent.

Upon determining the subscriber is not to be given credit for a reported activity, or upon giving the appropriate amount of credit, credit module 232 proceeds to determine if there are additional reported activities for the subscriber to be analyzed, 508. If so, credit module 232 repeats operation 504, and conditionally, operation 506, as described earlier. The process continues until all reported activities of a subscriber have been examined.

At such time, credit module 232 determines if there are additional reporting subscribers to be processed, 510. If so, credit module 232 repeats the above described process for another subscriber. The process continues until reporting for all subscribers have been analyzed (e.g. for one reporting period).

Figures 6, 8:
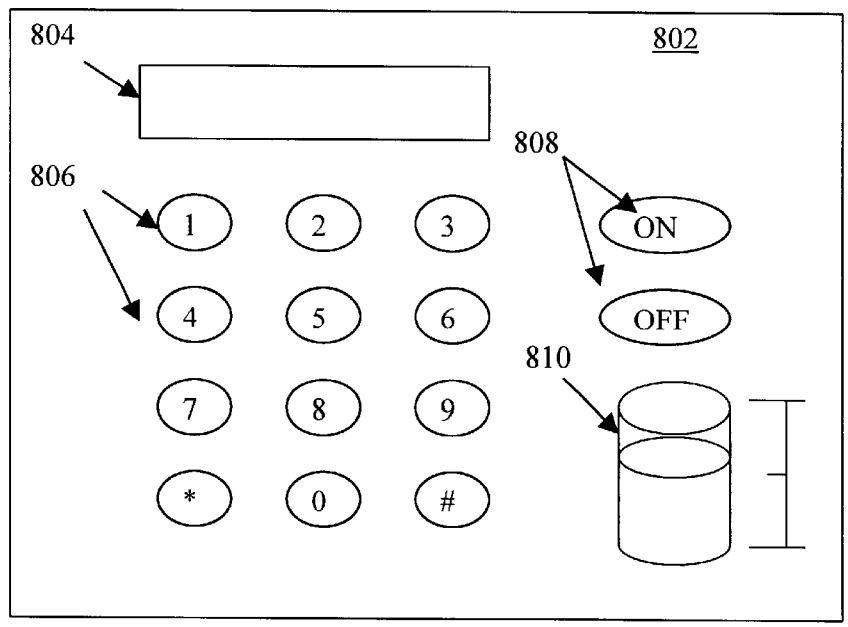
FIG. 6 illustrates relevent aspects of the subscriber database of FIG. 2, in accordance with one embodiment.
FIG. 8 illustrates an example end user interface for the packet phone of FIG. 2, in accordance with one embodiment.

Referring now to FIG. 6, wherein a database suitable for use as the subscriber database of the present invention is shown. As illustrated, database 600 includes at least one table storing various information for each subscriber. In particular, for the illustrated embodiment, the information includes subscriber identifier 602, credits given 606, and other information 604. Other suscriber information 604 may include a wide range of subscriber and service subscribed information, such as the subscriber's name, service address and phone number, billing address and phone number, email address, whether the subscriber has subscribed to call waiting, call conferencing, call forwarding, voice mail and so forth. In alternate embodiments, other data structures including, but are not limited to, flat files, hierarchical databases, link lists and so forth, may also be employed instead to track the credits given to the various subscribers.

Figure 7:
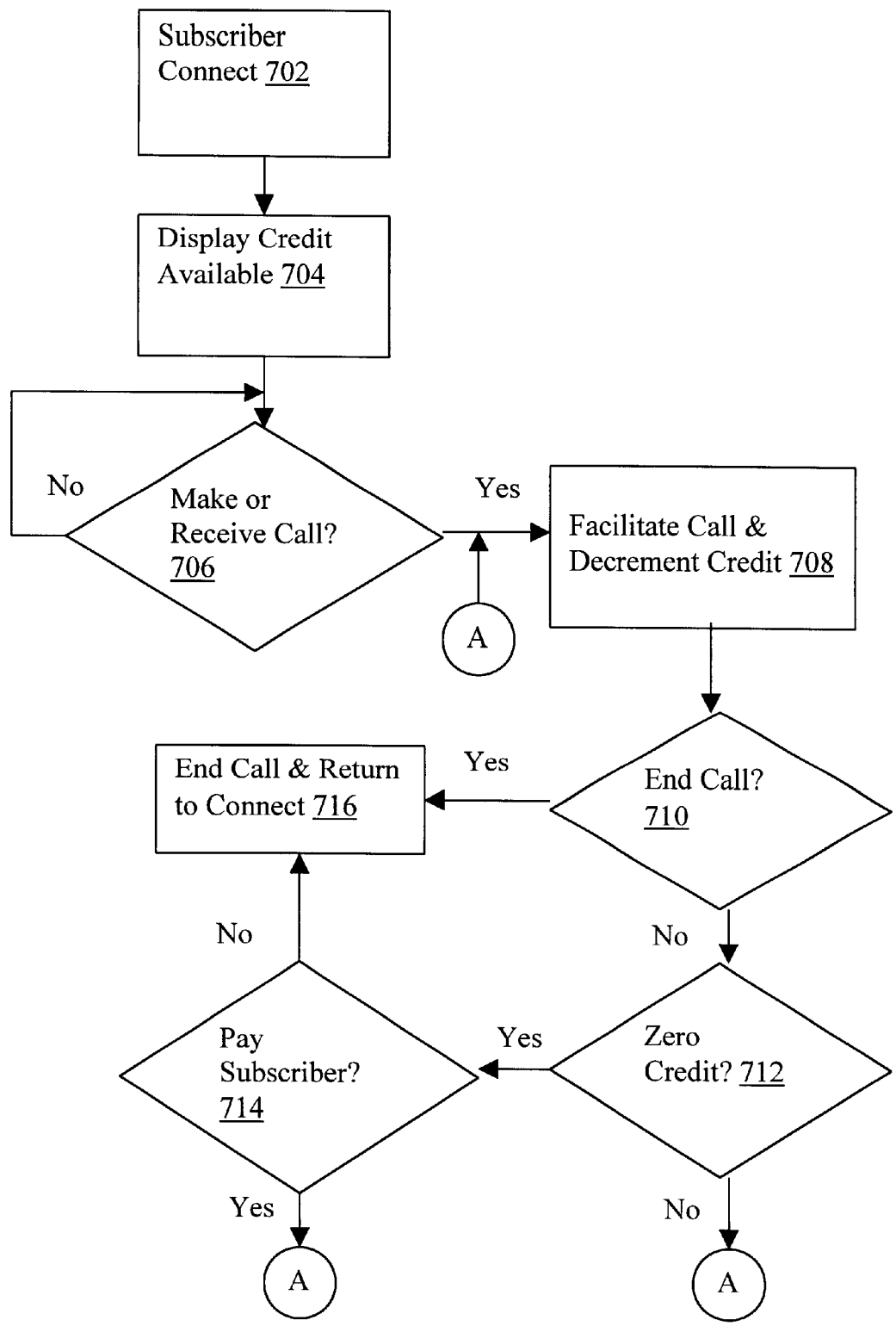
FIG. 7 illustrates an operation flow of the telephony service modules of FIG. 2, in accordance with one embodiment.

Referring now to FIG. 7, wherein a block diagram illustrating an operation flow of the telephony service modules of FIG. 2, in the context of the network environment of FIG. 2, is shown. As illustrated, at 702, telephony service modules 234 accept connection by a subscriber to telephony server 208. In response, for the illustrated embodiment, at 704, telephony service modules 234 cause the amount of telephony service credits available to be displayed for the subscriber, e.g. on the subscriber's client computer 202.

Thereafter, telephony modules 234 await the subscriber to make or receive a phone call, 706. Upon making or receiving a call, at 708, telephony service modules 234 facilitate the call as described in the aforementioned patent and patent application. In addition, at 708, telephony service modules 234 debit or decrement the subscriber's accumulated credit. The amount debited may be reflective of what the services otherwise would have cost. In one embodiment, telephony service modules 234 further cause the remaining amount of telephony service credits available to be refreshed, i.e. giving the user feedback on the remaining credit in real time. While facilitating the call, telephony service modules 234 continuously check to determine if the call is to be terminated, 710, and whether the subscriber has exhausted all accumulated credits, 712. In one embodiment, upon detecting that the subscriber has exhausted his accumulated credits, telephony service modules 234 further check to determine if the subscriber is a pay subscriber (i.e. whether the subscriber can be invoiced for the additional services provided), 714. If the call is to be terminated, or the subscriber has exhausted his accumulated credits and the subscriber is not a pay subscriber, telephony service modules 234 terminate the call accordingly, 716. Otherwise, telephony service modules 234 continue to facilitate the call, 708, until a termination condition is encountered.

Referring now to FIG. 8, wherein an end user interface of packet based telephone 230 of FIG. 2, in accordance with one embodiment, is shown. As illustrated, end user interface 802 includes conventional features, such as dial pad 806, on/off control buttons 808 and a display area for displaying information such as the number called, or the calling number. Additionally, in accordance with the present invention, end user interface 802 includes meter-like icon 810 for depicting the amount of telephony service credits available. As described earlier, in a presently preferred embodiment, meter-like icon 810 is refreshed in real time, as the credits are used, providing the user/subscriber with real time feedback on the amount of telephony service credits available.

Figure 9:
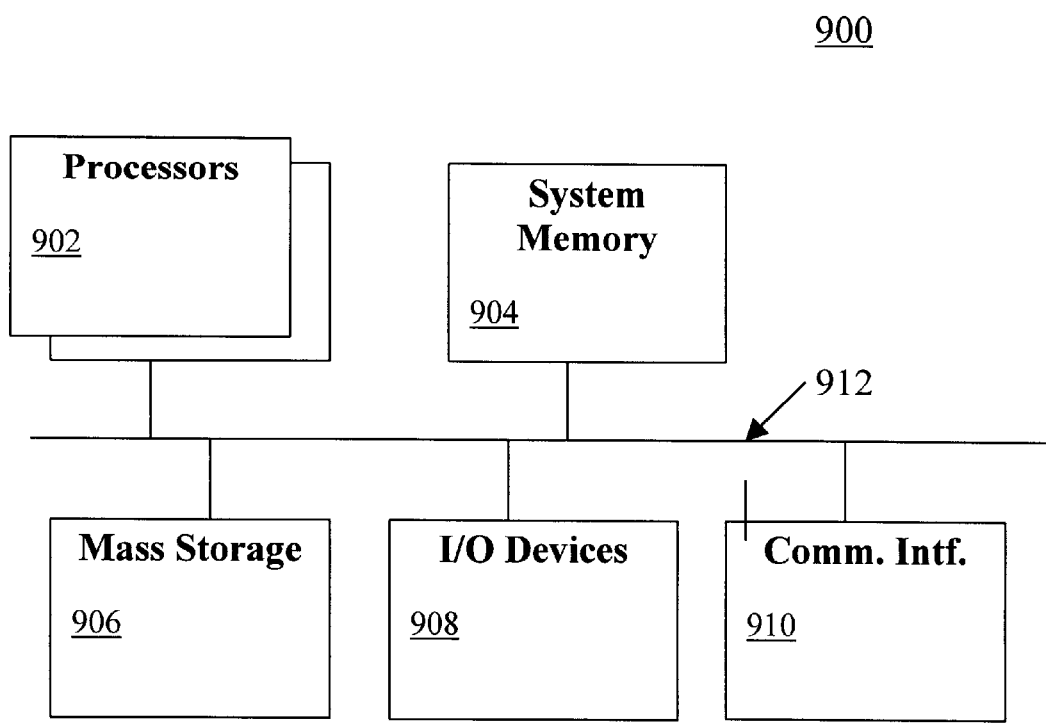
FIG. 9 illustrates a computer system suitable for programming with instructions to implement selected aspects of the present invention, in accordance with one embodiment.

FIG. 9 illustrates one embodiment of a computer system suitable to be programmed with programming instructions implementing selected aspects (i.e. client or telephony server) of the present invention. As shown, example computer system 900 includes one or more processors 902 and system memory 904. Additionally, system 900 includes mass storage devices 906 (such as diskette, hard drive, CDROM and so forth), input/output devices 908 (such as keyboard, cursor control and so forth) and communication interfaces 910 (such as network interface cards, modems and so forth). The elements are coupled to each other via system bus 912, which represents one or more buses. In the case of multiple buses, they are bridged by one or more bus bridges (not shown). Each of these elements perform its conventional functions known in the art. In particular, system memory 904 and mass storage 906 are employed to store a working copy and a permanent copy of the programming instructions implementing the selected aspects of the present invention. The permanent copy of the programming instructions may be loaded into mass storage 906 in the factory, or in the field, as described earlier, through a distribution medium (not shown) or through communication interface 910 (from a distribution server (not shown). The constitution of these elements 902–912 are known, and accordingly will not be further described.

Figure 10:
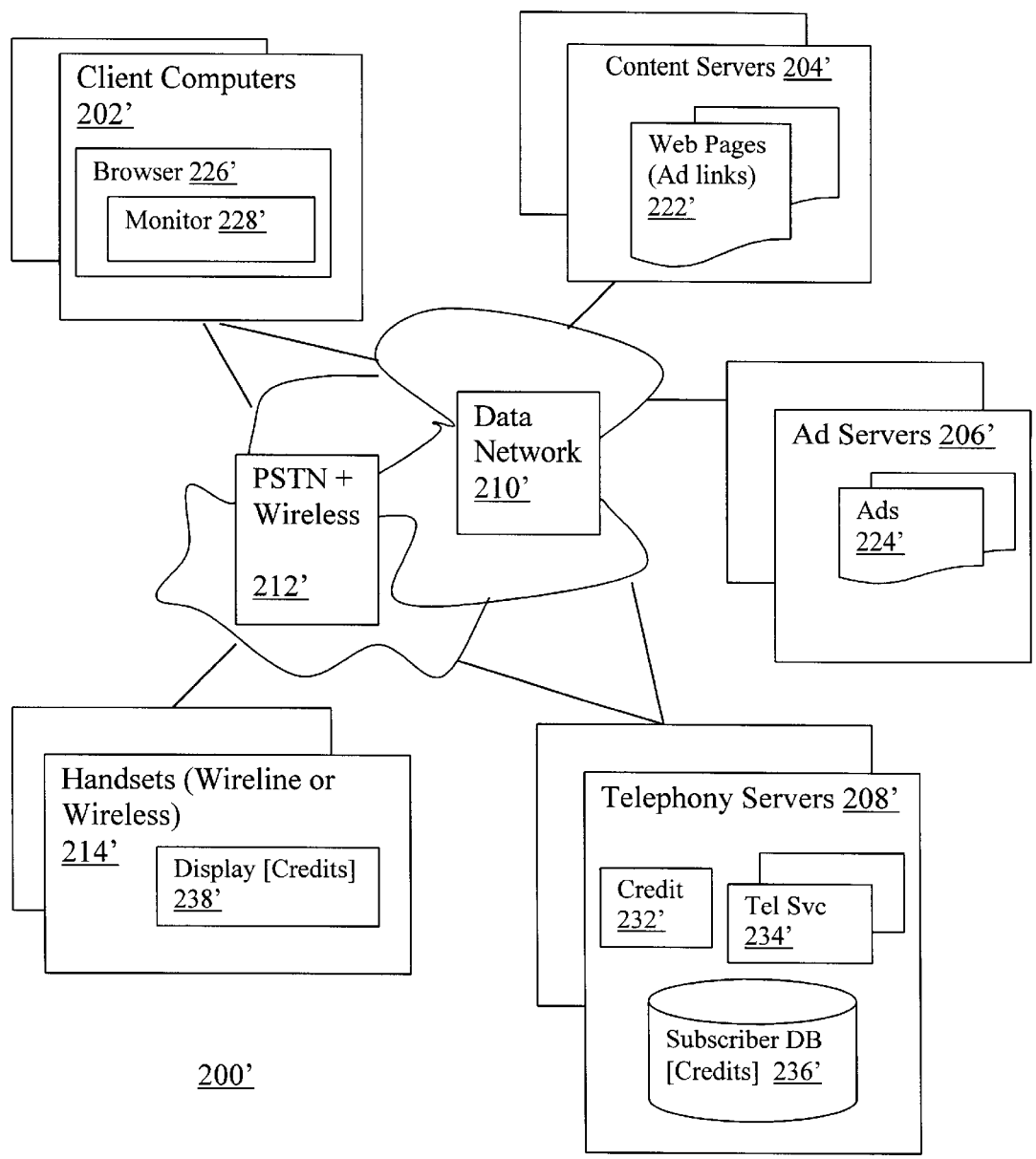
FIG. 10 illustrates another networking environment suitable for practicing the present invention, in accordance with another embodiment.

Referring now FIG. 10, wherein a block diagram illustrating another network environment suitable for practicing the present invention, in accordance with another embodiment, is shown. As illustrated, network environment 200' includes client computers 202', content servers 204', advertisement servers 206', telephony server 208', data network 210', "PSTN" 212', and handset 214' coupled to each other, and operate essentially as earlier described with references to FIGS. 2–9. However, under this embodiment, enjoyment, i.e. usage, of the accumulated telephony service credits are not necessarily via client computers 202'. More specifically, enjoyment of the accumulated telephony service credits may be made from a wireline or wireless handset 214'. "PSTN" 212' is intended to include the wireless telephone networks known in the art. It is contemplated that the local or central offices, or the wireless telephone service providers will service handsets 214' as telephony servers 208 service client computers 202 in the earlier described embodiment. Local/central offices and the wireless telephone service providers may determine/obtain the accumulated telephony service credits of the users of handsets 214' from telephony servers 208' (or from advertisement servers 206' if the credits are given and tracked by advertisement servers 206' instead, as alluded to earlier), via the Intelligent Network of PSTN 212' or data network 210'. Accordingly, it can be seen that the credit base telephony service facilitation may be extended from computer based telephony to substantially conventional landline and/or wireless telephony service. As illustrated, preferably, handsets 214' are advantageously equipped with a display (as most wireless telephone sets are) to facilitate the rendering of a meter-like icon to depict for the user the amount of telephony service credits available, and keeping the user informed of the remaining amount in real time.

Thus, a novel method and apparatus for facilitating telephony service based on credits has been described. As alluded to earlier, while the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method comprising:

monitoring advertisement consumption activities of a user;

crediting said user with telephony service credits in accordance with observed advertisement consumption activities; and facilitating telephony service for said user based at least in part on said telephony service credits credited to said user, said facilitating further comprising informing the user of the amount of telephony service credits available by causing a meter-like icon depicting the amount of telephony service credits available to be rendered.

2. A method comprising:

monitoring advertisement consumption activities of a user;

crediting said user with telephony service credits in accordance with observed advertisement consumption activities;

facilitating telephony service for said user based at least in part on said telephony service credits credited to said user, said facilitating further comprising informing the user of the amount of telephony service credits available and dynamically updating the user in real time on the amount of telephony service credits available.

3. The method of claim 2, wherein said dynamic updating comprises causing a meter-like icon depicting the amount of telephony service credits available to be refreshed.

4. A method comprising:

monitoring advertisement consumption activities of a user;

crediting said user with telephony service credits in accordance with observed advertisement consumption activities; and facilitating telephony service for said user based at least in part on said telephony service credits credited to said user, wherein said facilitation further comprises determining whether the user is a pay subscriber when the user exhausted his telephony service credits.

5. A method comprising:

receiving a report on advertisement consumption activities of a user;

crediting the user with telephony service credits in accordance with the reported advertisement consumption activities; and facilitating telephony service for said user based at least in part on the telephony service credits credited to said user, said facilitating further comprising informing the user of the amount of telephony service credits available by causing a meter-like icon depicting the amount of telephony service credits available to be rendered for the user.

6. A method comprising:

receiving a report on advertisement consumption activities of a user;

crediting the user with telephony service credits in accordance with the reported advertisement consumption activities; and facilitating telephony service for said user based at least in part on the telephony service credits credited to said user, said facilitating further comprising informing the user of the amount of telephony service credits available and dynamically updating the user in real time on the amount of telephony service credits available.

7. The method of claim 6, wherein said dynamic updating comprises causing a meter-like icon depicting the amount of telephony service credits available to be refreshed.

8. A method comprising:

receiving a report on advertisement consumption activities of a user;

crediting the user with telephony service credits in accordance with the reported advertisement consumption activities; and facilitating telephony service for said user based at least in part on the telephony service credits credited to said user, wherein said facilitation further comprises determining whether the user is a pay subscriber when the user exhausted his telephony service credits.

9. An apparatus comprising:

a storage medium having stored therein a plurality of programming instructions designed to receive a report on advertisement consumption activities of a user, to credit the user with telephony service credit in accordance with the reported advertisement consumption activities, as well as to facilitate telephony service for said user based at least in part on the telephony service credit credited to said user wherein said programming instructions are designed to cause a meter-like icon depicting the amount of telephony service credits available to be rendered to inform the user of the amount of telephony service credits available; and at least one processor coupled to the storage medium to execute the programming instructions.

10. An apparatus comprising:

a storage medium having stored therein a plurality of programming instructions designed to receive a report on advertisement consumption activities of a user, to credit the user with telephony service credit in accordance with the reported advertisement consumption activities, as well as to facilitate telephony service for said user based at least in part on the telephony service credit credited to said user, wherein said programming instructions are designed to inform the user of the amount of telephony service credits available, and dynamically update the user in real time on the amount of telephony service credits available; and at least one processor coupled to the storage medium to execute the programming instructions.

11. The apparatus of claim 10, wherein said programming instructions are designed to cause a meter-like icon depicting the amount of telephony service credits available to be refreshed.

12. An apparatus comprising:

a storage medium having stored therein a plurality of programming instructions designed to receive a report on advertisement consumption activities of a user, to credit the user with telephony service credit in accordance with the reported advertisement consumption activities, as well as to facilitate telephony service for said user based at least in part on the telephony service credit credited to said user, wherein said programming instructions are further designed to determine whether the user is a pay subscriber when the user exhausted his telephony service credits; and at least one processor coupled to the storage medium to execute the programming instructions.

\* \* \* \* \*